(12) United States Patent
Chen et al.

(10) Patent No.: US 6,920,238 B1
(45) Date of Patent: Jul. 19, 2005

(54) PRECISION IMAGING SYSTEM

(75) Inventors: Min Chen, Brookline, MA (US);
Roudolf S. Shouvalov, Protvino (RU);
Sergei Vasilievich Golovkine, Protvino (RU); Skiff Sokolov, Protvino (RU)

(73) Assignee: Synchrotronics, Co., Arlington, MA (US)

( * ) Notice: Subject to any disclaimer, the term of this patent is extended or adjusted under 35 U.S.C. 154(b) by 0 days.

(21) Appl. No.: 09/254,959

(22) PCT Filed: Dec. 3, 1996

(86) PCT No.: PCT/US96/19213

§ 371 (c)(1),
(2), (4) Date: Mar. 22, 1999

(87) PCT Pub. No.: WO97/21114

PCT Pub. Date: Jun. 12, 1997

(51) Int. Cl.[7] .................................................. G06K 9/00
(52) U.S. Cl. .................... 382/128; 378/98.4; 378/98.6; 378/113
(58) Field of Search .................................. 382/128, 129, 382/130, 131, 132, 100; 313/527, 542; 378/19, 98.3, 98.4, 98.6, 113, 137, 140, 185; 600/372, 431; 250/303, 585, 363.03, 267, 339.06, 339.11, 341.8, 472.1

(56) References Cited

U.S. PATENT DOCUMENTS

| | | | |
|---|---|---|---|
| 3,961,188 A | * 6/1976 | Barrett | 250/303 |
| 3,992,624 A | * 11/1976 | Flannery et al. | 378/74 |
| 4,093,859 A | * 6/1978 | Davis et al. | 378/7 |
| 4,193,089 A | * 3/1980 | Brougham et al. | 378/98.2 |
| 4,422,091 A | 12/1983 | Liu | |
| 4,633,076 A | 12/1986 | Butterwick | |
| 4,891,829 A | * 1/1990 | Deckman et al. | 378/4 |
| 4,995,396 A | * 2/1991 | Inaba et al. | 600/431 |
| 5,099,505 A | * 3/1992 | Seppi et al. | 378/65 |
| 5,319,203 A | * 6/1994 | Anderson et al. | 250/363.03 |

(Continued)

FOREIGN PATENT DOCUMENTS

| | | |
|---|---|---|
| DE | 3437203 | 4/1986 |
| EP | 87202369.2 | 11/1987 |
| EP | 0274775 A1 | 7/1988 |
| EP | 95308444.9 | 11/1995 |
| WO | PCT/US93/07205 | 7/1993 |
| WO | WO 94/03108 | 2/1994 |
| WO | PCT/GB94/02301 | 10/1994 |
| WO | WO 95/11461 | 4/1995 |

OTHER PUBLICATIONS

*Stereo X–ray Imaging using a single Multiple–Source X–ray Detector*, Min Chen et al.

*A high–resolution detector based on liquid–core scintillating fibres with readout via an electron–bombarded charge–coupled device*, C. Cianfarini et al.

C. Cianfarani et. al. A high–resolution detector based on liquid core scintillating fibres with Readout via an electron–bombarded charge coupled device Nuclear Instruments & Methods in Physics Research A 339 (1994) 449–455.

*Primary Examiner*—Kanjibhai Patel
*Assistant Examiner*—Abolfazl Tabatabai
(74) *Attorney, Agent, or Firm*—Stephen G. Matzuk

(57) ABSTRACT

An imaging system is disclosed for use in low-light environments or environments where low-levels of such radiation is desirable. Examples of such environments are night photography, laparoscopy, and mammography. In the case of radiation that is other than visible light, a radiation converter and method for fabricating same is disclosed. The radiation converter comprises a film of heavy scintillator (e.g. CdWO4) coated on a fiber optical window to efficiently convert the radiation into visible light. The visible light is passed into a signal amplifier employing an electron-bombarded charge-couple device (EBCCD) to amplify the signal. Novel methods of performing three-dimension imaging using this system as well as removing the effects of high speed movement are also disclosed.

20 Claims, 9 Drawing Sheets

U.S. PATENT DOCUMENTS

| | | | |
|---|---|---|---|
| 5,381,000 A | | 1/1995 | McKee, Jr. |
| 5,391,879 A | * | 2/1995 | Tran et al. .................. 250/367 |
| 5,821,552 A | * | 10/1998 | Ishikawa et al. ............ 250/585 |
| 5,864,146 A | * | 1/1999 | Karellas ..................... 250/581 |
| 6,201,850 B1 | * | 3/2001 | Heumann ..................... 378/56 |
| 6,236,033 B1 | * | 5/2001 | Ebbesen et al. ............ 250/216 |
| 6,448,560 B1 | * | 9/2002 | Tumer ................... 250/370.09 |

* cited by examiner

PRECISION IMAGING SYSTEM

BACKGROUND OF THE INVENTION

The present invention relates generally to precision imaging systems. More particularly, the invention relates to precision imaging systems that operate at low levels of radiation to form a high resolution image.

In medical imaging systems, such as mammography, and many other imaging systems, image resolution is an important system characteristic. This is particularly true in medical imaging through where the clarity and contrasts within an image directly affect the diagnostic capabilities of a physician. That is, the higher the resolution the earlier and easier the detection of abnormalities is. Likewise, industrial uses such as quality control of product components operate in much the same manner and lack of detection of abnormalities can have similarly disastrous results.

Higher resolution images can also help distinguish aspects of the image thus presenting additional valuable information. For example, if the image shows certain fractal duct structures then a physician may be able to deduce that a tumor is benign. Further, accurate representation of objects in the image, as to image size, for example, assists in diagnosis. That is the observation of a stable tumor size over time alleviates the fear of malignancies without intrusive and invasive operations.

Often such medical diagnostic imaging systems utilize x-ray image intensifier tubes which are well known in the art. The image intensifier tube has as a component a scintillator that converts an x-ray image, representing the absorption of x-rays by the structure to be depicted, into visible light. Devices such as this are widely used for medical observation. The visible light can then be made to impinge upon a photographic film or a photosensitive detector that electronically records the image. The film can then be developed for direct review, at the expense of time, or the electronic signals from the detector can be processed and transmitted to a cathode-ray tube ("CRT") or photographic recording system.

FIG. 1 shows a prior art scintillator 10 which is generally formed by depositing cesium iodide by vacuum evaporation onto a substrate 14. The thickness of the cesium iodide, or structured cesium, deposited generally ranges from 150–500 microns. The cesium iodide is deposited in the form of needles 12 each with a diameter of 5–10 microns. Since the refractive index of cesium iodide is 1.8, a fiber optic effect is obtained. This effect minimizes the lateral diffusion of the light within the scintillating material. A scintillator of this type, for example, is described in U.S. Pat. No. 4,803,366 dated Feb. 7, 1989.

The resolution of the image intensifier tube depends on the capacity of the cesium iodide needles 12 to properly channel the light. The cesium iodide as well as another popular material, sodium iodide, used as x-ray converters all have low detective quantum efficiency ("DQE") and/or poor spatial resolution.

These factors can be seen with more particularity in FIG. 2 which shows the blooming of a single pixel imaged using these conventional scintillators. The vertical axis represents intensity of the pixel and the horizontal axis represents position relative to the center of the pixel with respect to light. One skilled in the art will understand that the broader a particular function of light for a pixel appears on this graph, the lower potential resolution on a photosensitive medium, such as film or a CRT, since this will represent a blooming and a potential for cross-talk between individual pixels. Each line represents different prior art systems. Line 20 represents a Lanex fast screen; line 22 represents a nonstructured cesium iodide crystal layer of 220 micron thickness; line 24 represents a structured cesium iodide layer of 220 micron thickness; line 26 represents a Lanex fine screen; and line 28 represents a structured cesium iodide layer of 75 micron thickness.

Often, as is the case with x-rays, the radiation used to create the image has is potentially harmful effects on the subject of the examination. Devices with higher DQE reduce the required radiation doses per viewing and allow more frequent viewings for the observation of the growth rate of abnormalities. The density of cesium iodide and sodium iodide crystals is low, thus, prior art scintillators have a low DQE when the scintillator is thin. DQE can be raised by increasing the thickness, but this is done at the expense of spatial resolution.

Conventional methods of fabrication of scintillators, such as vacuum deposition or chemical vapor deposition, have difficulty making films of single crystals of more than a few microns thick. This, in turn, detrimentally affects the light conversion efficiency of the scintillator.

Once the scintillator converts the x-ray image into visible light, there is often still the problem of inadequate light to adequately resolve objects clearly in the image by a detector in the image intensifier tube. The problem is common in various other applications such as endoscopic or laparoscopic imaging, and non-medical imaging such as night-vision photography, for example.

Commercially available systems of the aforementioned types generally use as a detector a room temperature charge-coupled device ("CCD") to electronically capture the image-bearing light. Such a CCD has no gain and, therefore, low signal-to-noise ratio, thus requiring intense light illumination. Each pixel in the CCD converts incoming photons into electron-hole pairs. This conversion is made with an efficiency about 30%. Mainly due to the thermal noise of the readout electronics, there is a large noise produced in each pixel even if there is no input light. This noise is typically 100 electrons per pixel for 10 MHz readout frequency. Therefore, in order to have a reasonable signal-to-noise ratio, about 2000 photons per pixel are needed for a standard CCD at room temperature, with a quantum efficiency 30%.

One solution to this problem has been to use a cooled CCD which has less noise because it is cooled to a low temperature. Even with the cooled CCD though, a large quantity of photons, approximately 400 photons, per pixel are required to have a reasonable signal-to-noise ratio.

Electron-bombarded CCDs achieve some of the desired sensitivity but have other drawbacks. Conventional front-side electron-bombarded CCDs have low radiation resistance resulting in significant degradation of an integration dose of about $10^6$ photoelectrons per pixel, corresponding to a lifetime of 50 seconds with illumination of $10^{-2}$ lux. Backside thinned EBCCDs are available but are not generally used because of technical difficulties such as obtaining a uniform sensitivity.

In medical imaging, a further diagnostic advantage is gained by three-dimensional reconstruction of images. Such reconstruction followed by reproduction on the screen of the various representations of tissue, such as the breast, density (similar to representation available in computer tomography) has great clinical values, facilitating the diagnostics and reducing the percentage of errors. However, prior art systems have not been able to reproduce exact spatial fixation of the soft flexible tissue, which is too flexible for its fixation with submillimeter accuracy. Therefore, image shadows do not match accurately enough to allow the reconstruction of the three-dimensional image with the full resolution of the detector.

Accordingly, it is an object of this invention to provide a scintillator that resists blooming and pixel cross-talk so as to create a high resolution image.

It is another object of this invention to provide a scintillator with a high DQE without sacrificing spacial resolution.

It is still another object of this invention to provide a scintillator of high resolution that can be used for both displaying an image on an electronic screen or presenting the image to photographic film.

It is still another object of the invention to provide a CCD that operates at low levels of light.

It is still another object of the invention to provide an accurate three-dimensional image.

It is a further object of the invention to provide methods in accord with the above apparatus.

These and other objects of the invention will appear obvious and will appear hereinafter.

SUMMARY

The aforementioned and other objects are achieved by the invention which provides an imaging system for use in low-light environments or environments where low-levels of such radiation is desirable. Examples of such environments are night photography, laparoscopy, and mammography.

In the case of radiation that is other than visible light, a radiation converter is used to convert the radiation into visible light. The radiation converter operates in conjunction with a photosensitive medium in an imaging system. The imaging system being such that the radiation is projected upon a structure and variable absorption of the radiation by the structure imprints an image of the structure on the radiation. The radiation converter then converts the radiation, and thus the image into visible light which is in turn recorded by the photosensitive medium. The radiation converter comprises a scintillator, usually a film of $CdWO_4$ coated on a light guide, such as a fiber optic window or light guide, to efficiently convert the radiation into visible light.

The scintillator is adapted to convert a predetermined range of wavelengths of radiation into visible light. Generally, the predetermined range of wavelengths will correspond to the range of wave lengths of light known as x-rays, though other wave lengths may also be used.

The scintillator is attached to the light guide, preferably using an adhesive. To achieve the desired properties, the scintillator is then precision machined to a uniform thickness. Upon excitation of the scintillator by the radiation, the scintillator converts the radiation into visible light. The visible light passes into the light-conductive plate which is in optical communication with the scintillator.

The light guide provides an optical communication path through which the visible light is transported to the photosensitive medium.

The visible light is passed into a signal amplifier employing an electron-bombarded charge-couple device (EBCCD) as the photosensitive medium to amplify the signal. The EBCCD records the light electronically and communicates an electronic representation of the image transmitted by the light to electronic circuitry associated with the EBCCD. In this way the image can be portrayed on a standard cathode ray tube ("CRT"), or other type of computer displays, or it can be directly printed onto a photographic media such as photographic film or standard x-ray film.

If a three-dimensional image is desired then an angle associated with the path of the radiation is changed such that a stereo pair of images is created.

If there is object movement in the image then such movement is compensated for by analyzing and synchronizing the images.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a wide variety of electronic imaging devices and may be embodied in several different forms, it is advantageously employed in connection with mammogram systems using x-ray radiation. Though this is the form of one preferred embodiment and will be described as such, this embodiment should be considered illustrative and not restrictive.

Figure 3:
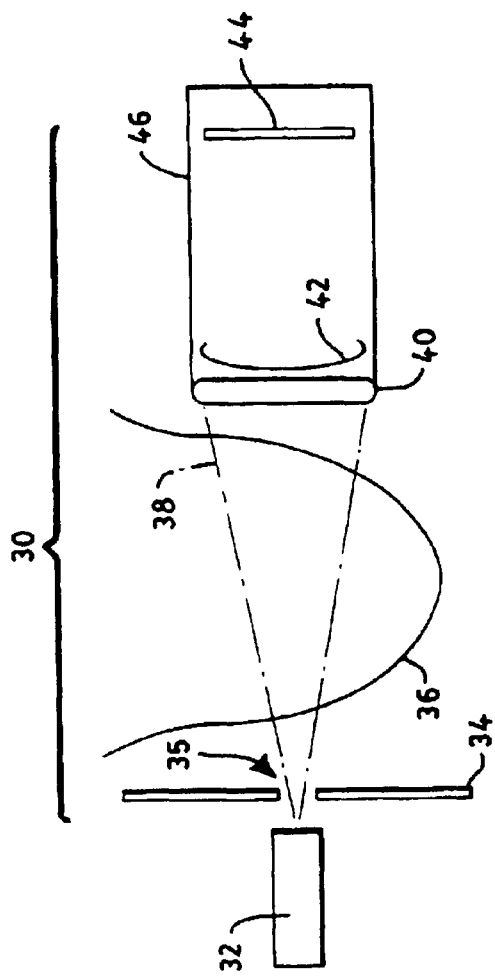
FIG. 3 shows a block diagram of a preferred embodiment of the invention where the radiation converter of the invention is used with a mammography system.

FIG. 3 shows a mammographic system 30 for detecting abnormalities in breast tissue. The mammographic system 30 has a radiation source 32 which projects radiation 38. When actuated, a shutter 34 opens allowing the radiation 38 to pass through an aperture 35 created by opening the shutter 34. The radiation then penetrates into the object being examined, a breast 36 in the case of the mammography. The radiation source 32 projects high-energy photons having a predetermined range of wavelengths into the breast 36. In the preferred embodiment, the high-energy photons are x-rays having a wavelength in the approximate range from 0.01 to 100 nanometers. The radiation 38 is selectively absorbed by the breast tissue thereby imparting an image onto the radiation 38 called a radiation shadow.

The radiation converter 40 converts the radiation 38, and thus the image transmitted thereby, into image-bearing visible light. The conversion is preferably performed such that the image represented by the image-bearing light is substantially identical to the image transmitted by the radiation 38.

In the preferred embodiment, the image-bearing light is then passed into a photocathode 42 and is imaged onto a photosensitive medium 44. The photocathode 42 is necessary for use with an Intensified Charge-Coupled Device ("ICCD") which is the photosensitive medium 44 used in the preferred embodiment. However, the photocathode 42 need not be used with a convention CCD. Also, in the preferred embodiment, the photocathode 42 translates light into electron emissions and therefore, the photosensitive medium 44 is photoelectron sensitive as is well known in the art.

The image intensifier tube 42 and the photosensitive medium 44 are housed within a light-tight housing 46 such that the only light presented onto the photosensitive medium 44 is the image-bearing light from the radiation converter 40.

The photosensitive medium 44 can be any of various devices well known in the art, such as photo-detectors and chemical-based photographic film. One skilled in the art will realize that any of various photo-detectors can be used in the invention, including the commonly available CCD or charge injection device ("CID") as well as the aforementioned ICCD. Further, the image conveyed by the image-bearing light can be directly imaged onto any of various chemical-based media such as instant photographic film, thirty-five millimeter film or x-ray film, all of which are well known in the art.

In the case that the photosensitive medium 44 is a photo-detector, an electronic representation of the image transmitted by the image-bearing light is created within the electronic detector and is transmittable digitally to other electronics. For example, electronic representation is digitally transmittable to a computer for immediate viewing. Such viewing can be achieved in real time such that images from the mammographic system 30 are displayed substantially instantaneously. Further, the computer can perform digital signal processing on the image in real time or in an off-line mode where the criteria of the digital signal processing are governed by the physician or an assisting technician. In this way, low contrast details in the mammographic images can be analyzed by the physician and precise locations of abnormalities can be ascertained for later biopsy should that be needed. On-line digitization allows for many possibilities of improving the image quality with digital signal processing.

Additionally, since the image is digitized, the image may be viewed on a computer either attached directly to the mammographic system 30 or remotely so that the image can be viewed within the same room, across town or across the world using computer communication technology well known in the art.

Radiation Converter

To achieve the aforementioned results, the radiation converter 40 must be fabricated to have a high spatial resolution and a high detective quantum efficiency ("DQE"). Further, a higher DQE results in a mammographic system 30 that requires less radiation to produce an image, thus reducing health risks to a patient due to exposure to the radiation. Detective quantum efficiency is defined as the square of the ratio of the signal to noise ratio of a real detector to the signal to noise ratio of an ideal, or perfect, detector, i.e., $$DQE = [(S/N)_{out}/(S/N)_{in}]^2$$

$$N = [(S/N)_{out}]^2/N$$

for N incoming photons.

In the preferred embodiment the radiation converter 40 has a spatial resolution of approximately 33 microns full width half maximum ("FWHM") of the line spread function and a DQE of approximately eighty (80%) percent for 20 KeV x-rays, a common transmission rate in mammography. FWHM is defined as line width at fifty percent of peak probability. Therefore, there is an approximately 78% probability of being within the region of FWHM. These levels were previously not attainable in the art. The invention attains these levels by fabricating the radiation converter 40 in a novel way.

Figure 4:
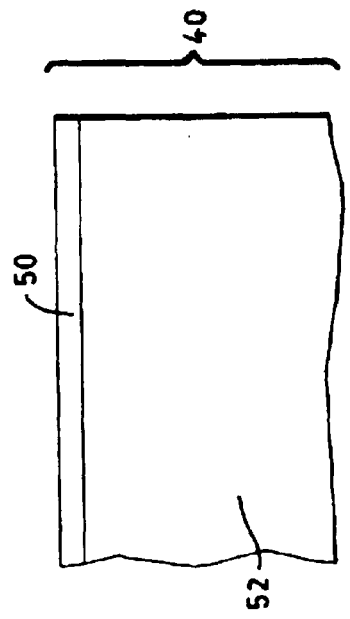
FIG. 4 shows a schematic of the radiation converter of FIG. 3.

With reference to FIG. 4 and continuing reference to FIG. 3, the radiation converter 40 of this embodiment is comprised of a scintillator 50 attached to a fiber optic plate 52. The scintillator 50 is a substance that glows when hit by high-energy particles or radiation. In making the radiation converter 40, the scintillator 50 is glued to a substantially planer fiber optic plate 52 which is comprised of millions of tiny fibers glued together.

The fibers are on the order of 5-10 microns in diameter and act to transport the light to the photocathode 42. Each of the tiny fibers transmit light for one, or a portion of one, pixel in the image. Optical fibers are immune to electromagnetic interference (from lightning, nearby electric motors, and similar sources) and to crosstalk from adjoining fibers, and thus maintain a sharper image during transmission to the photosensitive medium 44.

The scintillator 50 is much heavier than conventional scintillators but with a substantially equivalent light yield and is, therefore, a much more efficient converter of radiation. Further, the scintillator 50 is made thinner relative to other prior art scintillators while also achieving better spatial resolution and higher DQE. The scintillator 50 is heavier due to a density of at least 6 grams per cubic centimeter. This density increases the ability to precisely machine the scintillator to the desired thickness as well as have a large DQE with a scintillator sufficiently thin to maintain excellent spatial resolution. In the preferred embodiment, the scintillator 50 has a density of 8 g/cm$^3$ and is comprised of a cadmium tungsten oxide (CdWO$_4$) or lutetium oxyorthosilicate (Lu$_2$SiO$_5$). These choices of materials increase the DQE and spatial resolution of real time digital imaging devices. One skilled in will realize that numerous other compounds may be substituted for those described above without detriment to the invention. Preferably though, the compound has sufficient density and produce a large light yield to convert radiation to visible light (300 to 700 nm), is radiation resistant, and has an index of refraction not much higher than that of optical fibers.

Once the scintillator 50 is attached, the radiation converter 40 is precision machined to reduce the thickness of the scintillator 50, approximately 50 microns thickness in the preferred embodiment. The thickness of the scintillator 50 is determined in the design stage by balancing the DQE against spatial resolution.

Figure 1:
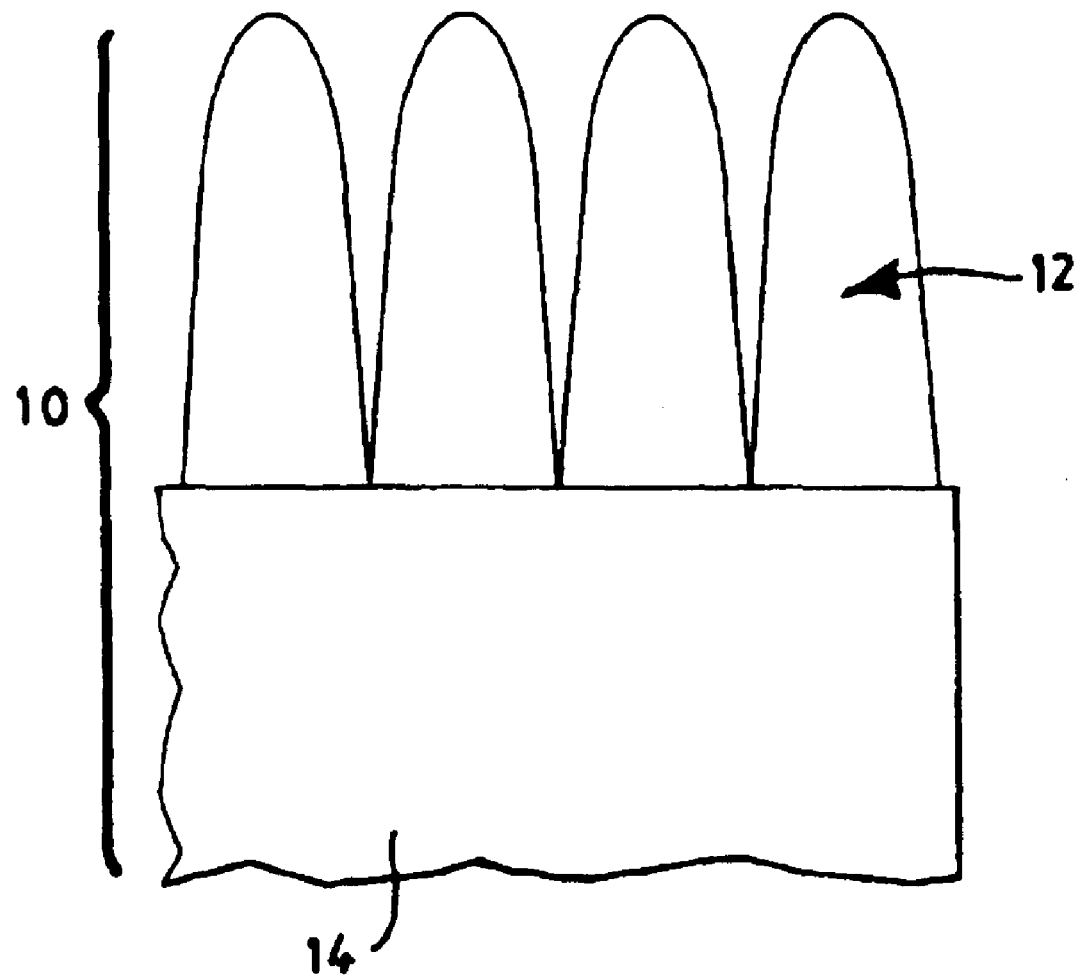
FIG. 1 shows a schematic diagram of a prior art scintillator.
Figure 2:
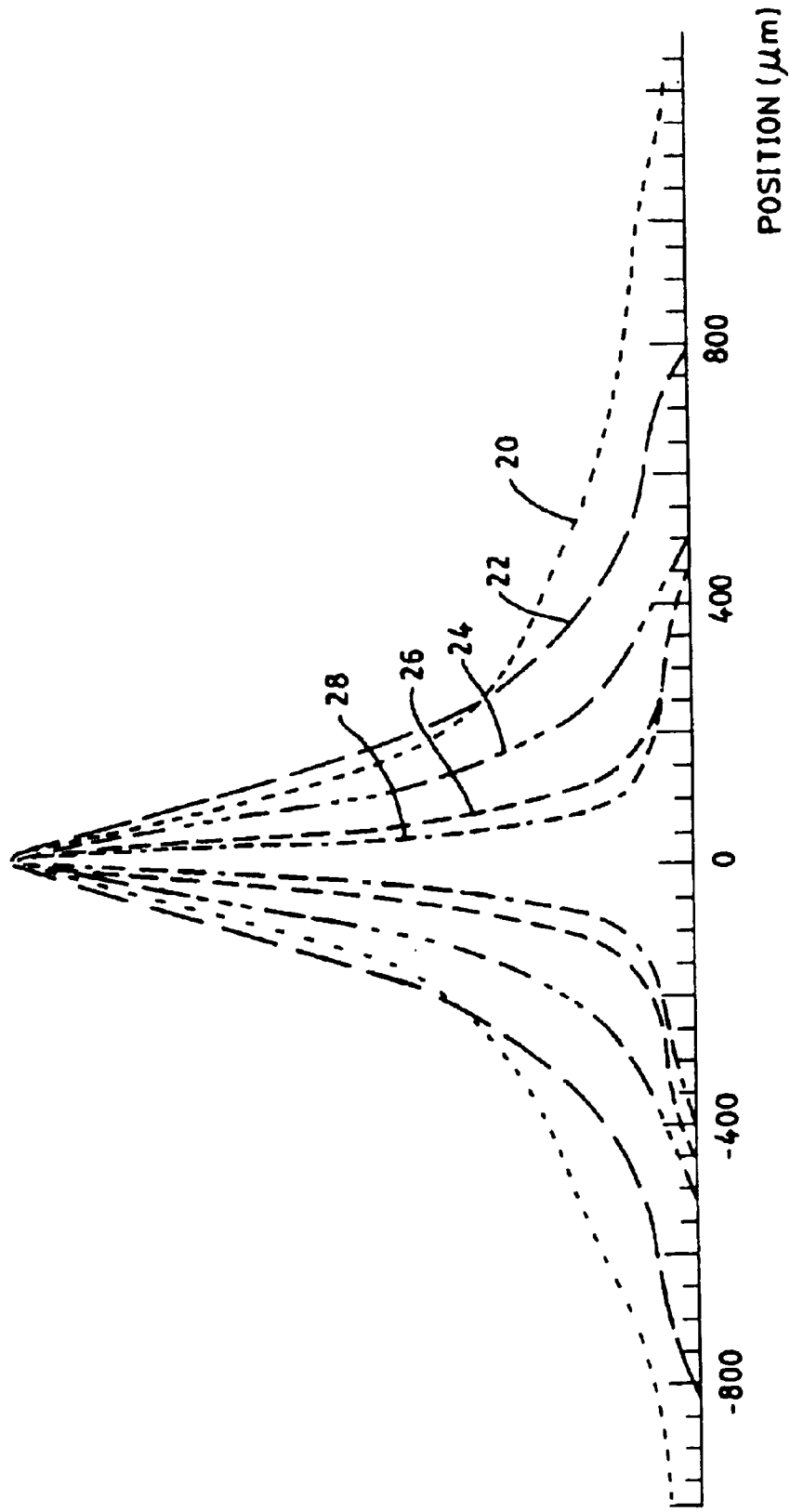
FIG. 2 shows a series of graphs representative of light intensity with respect to position for a single pixel in various prior art scintillators.
Figure 5:
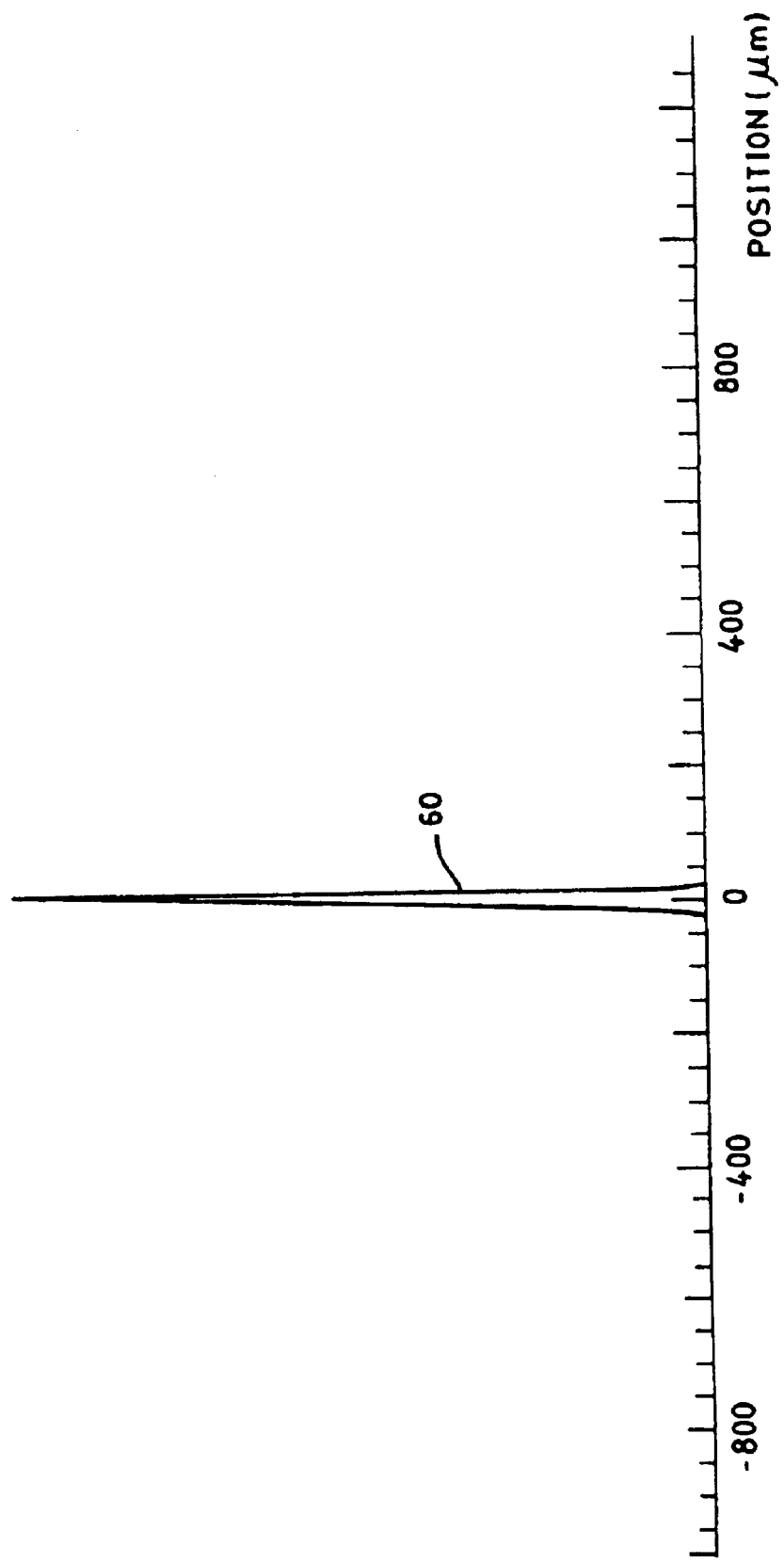
FIG. 5 shows a graph of light intensity versus position for a single pixel generated by the scintillator of the radiation converter of FIG. 4.

FIG. 5 is a graph of position versus intensity for a single pixel using the scintillator of the invention. The graph uses the same axes as that described for FIG. 2 for comparison purposes. It can be seen that the pixel described by the graph 60 has far less cross talk and blurring than those shown in the prior art.

In alternative embodiments of the invention, the scintillator 50 is adapted to convert other types of radiation. In one embodiment, the scintillator 50 converts ultra-violet light. In this embodiment, the scintillator 50 is a thin, approximately 500 nanometer, layer of material, p-terphenyl or sodium salicylate for example, that phosphoresces when exposed to ultraviolet light. The ultraviolet light is thus converted into visible light which is guided by the fiber optic plate 52 to the photosensitive medium 44 as previously described. One possible application of this system is ultra-violet imaging of the night sky to find new stars.

Another embodiment of the scintillator 50 converts infrared light. In this embodiment, the scintillator 50 is a thin layer of Galium Arsonide which phosphoresces when exposed to infrared light. The infrared is thus converted into visible light which are converted into electrons and transmitted to the photosensitive medium 44 as previously described. Additionally, the photocathode 42 is changed to a galium-arsonide photocathode to convert photons into photoelectrons. Applications for this system include use in a night vision cameras or night vision goggles.

Three-Dimensional Imaging

Figure 6:
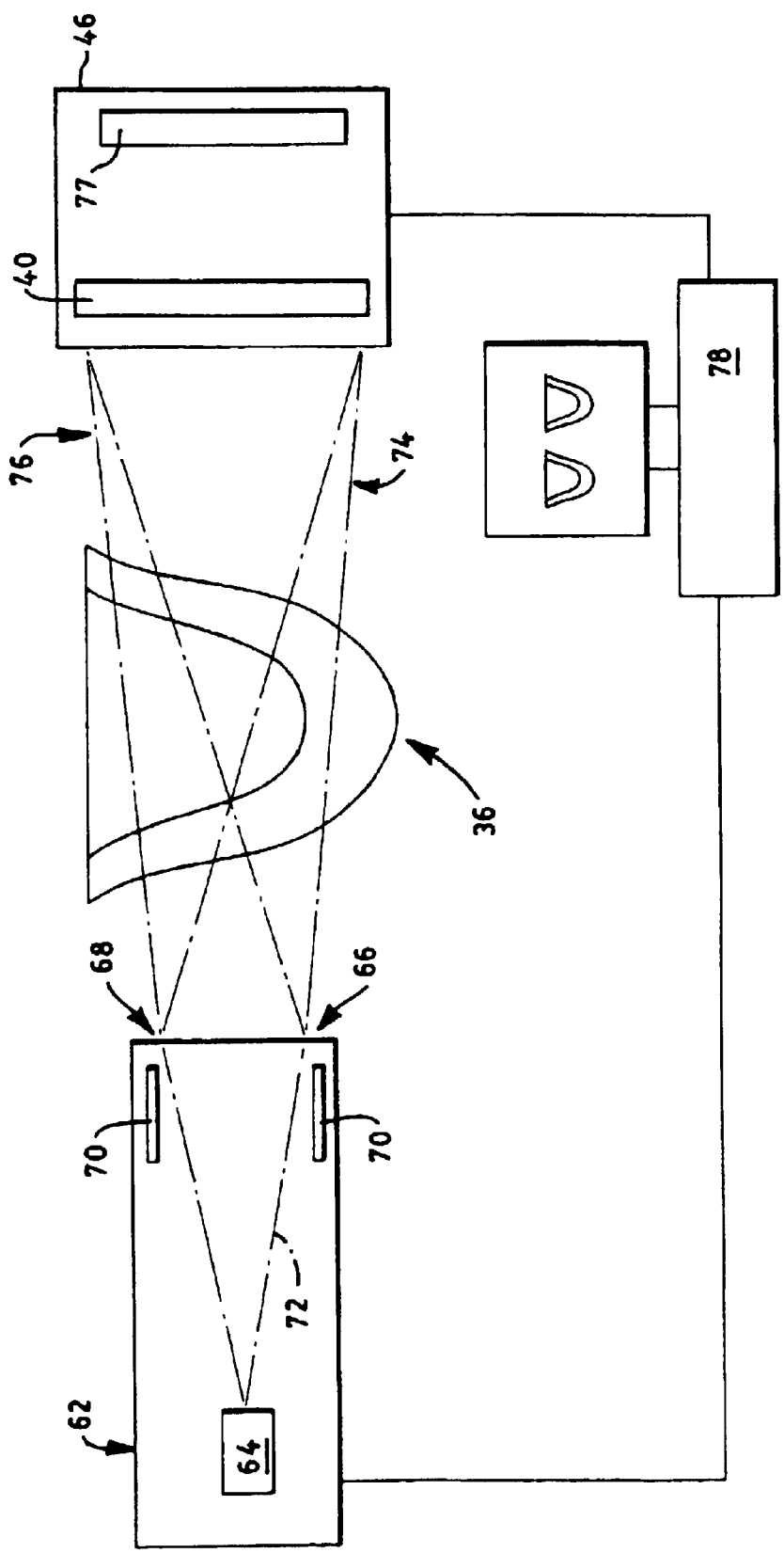
FIG. 6 shows a block diagram of a mammographic systems for generating three-dimensional images.

In another embodiment of a mammography system 60 shown in FIG. 6, high-resolution stereo-X-ray photographs and stereo-pairs of three-dimensional ("3-D") mammographs can be generated. Digital mammography has the capability to make 3-D reconstruction of images.

The reconstruction that obtains a substantially matching projection of a soft organ, such as a breast 36, is accomplished by moving the radiation source 62 electronically without any mechanical alteration of the fixation of the breast 36 or the photosensitive medium 44. An electronic shift is used to shift the radiation source 62 such that the breast 36 has virtually no time to change its shape and position, regardless of whether it is firmly fixed. In the preferred embodiment, an image is taken every one millisecond, so every pair of images is not mismatched due to fixation fault.

The electronic shift of the radiation source 62 requires either the use of two or more switchable radiation guns, or, as is provided in the preferred embodiment, a single radiation gun 64 with several targets 66, 68 and a deflection system 70 shifting the radiation beam 72 from first target 66 to second target 68. Deflection is then achieved by applying an external, either electric or magnetic, field to relocate the radiation beam between the targets 66, 68. Generally, the distance between targets 66, 68 is on the order of 1 cm, though one skilled in the art will realize that numerous configurations are possible. In the preferred embodiment, the position of the radiation beam 72 is electro-magnetically shifted from the first target 66 to the second target 68, about 1 cm within less than three milliseconds in a manner similar to that of a CRT. Such a rapid shift of the radiation beam 72 requires the radiation source 62 that has at least two targets 66, 68 and a deflection system 70.

As previously stated, the radiation source 62 may have several switchable cathodes or a pair of X,Y deflectors 70. However, instead of using two sine-wave oscillators with a 90 degree phase shift relative to each other which makes the electron beam move in a circle, a step-pieced approximation is used. Assuming the step duration of T seconds, the electron beam will stay in a position $X(i)$, $Y(i)$ during T and during the next step—in a position $X(i+l)$, $Y(i+l)$. A step-pieced function is prepared by a special programmable function generator and then is amplified by a power driver up to a few hundred volts as in oscilloscopes, as is well known in the art. There are an arbitrary number of anodes. If step-pieced function is synchronized with the detector, any slice can be obtained.

In either of the previously described radiation source configurations, two radiation shadows 74, 76 are generated. The first radiation shadow is projected onto the radiation converter 40 and is converted into visible light. The visible light then impinges upon a detector 77 which generates an electronic representation of the image in the visible light. One skilled in the art will realize that in the case that the detector is an ICCD, electron-hole pairs would impinge upon the detector 77 and a photocathode (not shown) would convert the visible light into the electron-hole pairs. The electronic representation is then transferable to a computer 78 which is adapted to display the image. Likewise, the second radiation shadow is converted and transmitted to the computer 78. Thus, the two radiation shadows 74, 76 become a stereo-pair, each presenting a different angle of the image. The stereo pair is then manually adjusted to the distance between human eyes to form a 3-D image.

Human eyes are able to recognize the nature of objects and to distinguish more details on a stereo image better than on a flat one. In particular, the numerous shadows of fibrous tissues in mammary glands impede the observation of low-contrast formations in flat images but not necessarily in stereo images. Moreover, if a physician viewing the 3-D image notices anything clinically interesting in the image, the stereo-pair can be further processed by a computer 78 and a three-dimensional distribution of the organ density can be reconstructed.

Further, as the number of exposures from differing view-points increase, a physician can see structures within the organ to from different sides. Since the generation of the screen image on the computer 78 can be done during a fraction of a second, the choice of the next view-point can be done interactively, depending on what was seen already. Moreover, these new angles provide additional data such that the computer 78 can more accurately model the structures creating rotatable images and providing the physician with numerous viewing options.

The radiation source 62 for 3-D imaging is designed to have two notable distinctions from a typical radiation source.

First, conventional radiation sources are usually made to produce substantially parallel (weakly divergent) rays, so the radiation source is placed far from the object and is collimated in both position and angular acceptances. In contrast, the radiation source 62 of the invention provides divergent rays and, therefore, can be close to the object and needs no collimation in angular acceptance. Hence, the radiation source 62 needs less power and smaller security shielding, and the radiating spot produced by the radiation beam 72 is smaller which improves image resolution. Moreover, the radiation source using divergent radiation beams is easier to make than a radiation source requiring tightly collimated beams.

Second, to generate mathematically tomographic slices and/or stereo-views from several photos taken in collimated beams as is done in the prior art, a very difficult full-scale tomographic reconstruction is needed. However, if divergent beams are used, two images captured for two source positions form a stereo pair without any mathematical processing. In most cases, the stereo pair may be used instead of tomographic slices. In such cases, computer processing may be needed only to change the scale, to subtract background, to improve contrast, or to perform other image processing. Interactively is also enabled in this way. For example, if a small calcification is seen and marked by a computer pointing device, the computer locates exact coordinates of calcification grain in space.

In another embodiment, the radiation beam 72 is continuously deflected producing generating dozens of different image shadows registered by the detector 44. This produces images that can be interactively "focused" by a physician to various levels, or depths, within the breast 36. For example, Let N represent the number of image shadows registered by the detector where each image shadow is obtained from a different position of the radiation beam 72. Assume that the object being viewed contains a small abnormality, such as a small grain-like calcification. The position of the shadow generated by the abnormality on each image shadow will be different. The relative shift of the shadow positions on different image shadows is proportional to the distance from the abnormality to the detector 77 and can be calculated from the known positions of the radiation gun 64 and an assumed distance, L, of the abnormality from the detector.

To calculate a total shadow density, the image shadows are shifted such that the image shadow of the abnormality occupies the same place on all the images. The signals (shadow densities) from all N images are then summed. The shadow density from this abnormality and the signals from all other details of the object that are situated at the same distance L from the detector 77 as the given abnormality will sum and become N times bigger. However, the shadows from the details that are closer to the detector or are farther from the detector 77 are displaced on different images and the summation of the signals will not increase these details. Therefore, on the summed image, these details will appear in N copies, each copy being N times less intense than the signals from details situated at distance L. If N is in the range of 20–40 or more, the images of the details of the object that are not at the distance L are practically invisible and make a blurred background. The summed picture however, is clear. The overall image is then analogous to the image visible in a short-focus microscope: only the details lying in the focal plane are sharp and visible, the details that are a bit closer or farther away are blurred. Thus, having a multiple images from slightly shifted point sources enables reconstruction of any slice of the object parallel to the detector window.

In usual tomographs, reconstruction requires substantial computing and is time intensive. In the invention as described, reconstruction is reduced to very simple mathematical operations: shifts of the images as a whole and summation of signals. The reconstruction can then be performed in real time and interactively, where selectively changing a position of the focal plane of the slice by pressing keys on the keyboard or moving the mouse.

Additionally, since this system differentiates foreground from background, the background can easily be subtracted from the image or a new background can be inserted to enhance viewing, a coordinate grid for example.

In fabricating the radiation source of the preferred embodiment, the size of the spot on the target 66, 68 inside the radiation source 62 where the fast electrons are stopped and the gammas are produced is preferably less than 50 microns. Otherwise, the image on the detector 77 will be smeared. The target 66, 68 should be much larger than the source beam 72, preferably 2 cm or more.

The Detector

As previously mentioned, the photosensitive medium can be an electronic detector. In the preferred embodiment, the electronic detector is optimized for low-light applications, thus requiring less radiation to form an image. Such a detector is known in the art as an Intensified Charge-Coupled Device ("ICCD"). An ICCD has a very fine pixel size with excellent spatial resolution as well as a high signal-to-noise ratio at very low light intensities.

Electron Bombarded Charge-Coupled Device ("EBCCD") and Imaging Intensified Charge-Coupled Device ("IICCD") are both ICCD's that are many orders of magnitude more sensitive than the CCDs currently used in the art. They have particular application in medical systems in which there is difficulty illuminating an object to be imaged. Examples of such systems are endoscopy and laparoscopy. Though these will be described as a preferred embodiment, this application should be considered illustrative and not restrictive.

Use of thinner endoscopes, e.g., about 1 mm diameter, have an obvious advantage of requiring smaller opening in a patient's body and thus is less painful for the patient during the operation and accelerates healing. Conventional endoscopes are 5 or 10 mm though due to high light requirements of conventional CCDs.

Figure 7:
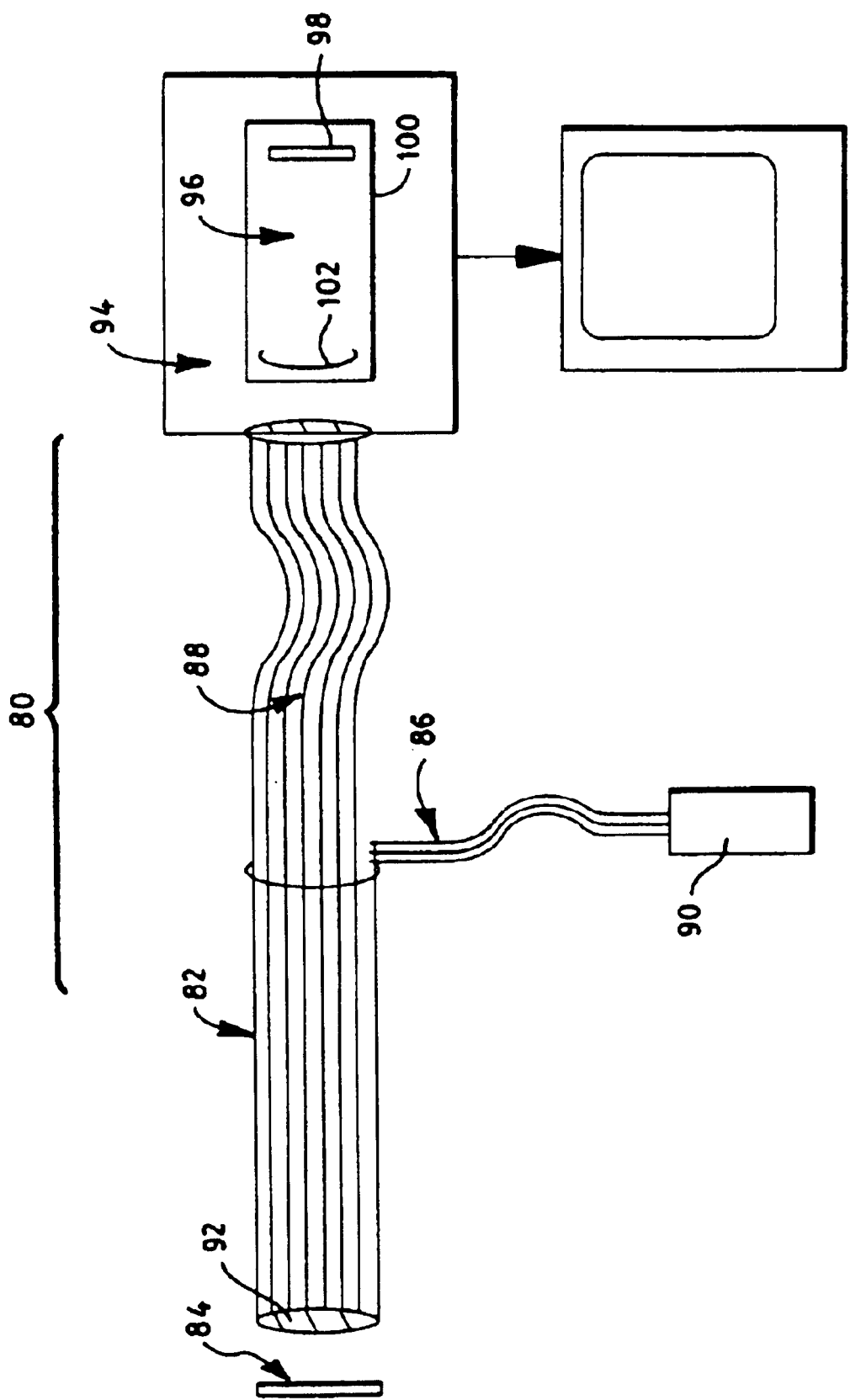
FIG. 7 shows a block diagram of an endoscopic system using the invention.

Referring now to FIG. 7 an endoscope 80 is shown having a fiber bundle 82 that is inserted into a patient's body to view an object 84, an organ for example. A first set of fibers 86 transmit light from a light source 90 into the body to illuminate the object 84. The light source 90 is typically a xenon lamp with a 200–300 Watts of power.

An objective lens 92 in front of a second set of fibers 88 collects light reflected from object 84 within the body and the second set of fibers 88 then transmits the light to a camera 94. The light is transmitted into an EBCCD 96 which translates the light into an electronic signal.

Typically when the diameter of a fiber bundle is reduced by a factor of ten, as is the case in this embodiment as compared to conventional endoscopes, there is a loss of photons on the order of a factor of approximately 100,000 in the intensity of the resultant images. The EBCCD 96 used in the invention compensates for the loss of light by being a factor of approximately 1,000 more sensitive than conventional CCD cameras. Thus for the same quality of image intensities, the endoscope 80 of the invention can be about a factor of ten smaller in diameter, or a factor of 100 smaller in area.

in comparison, the EBCCD device used in the present invention has a linearity range of $10^4$ and a resolution about 20 microns FWHM which are focused and accelerated to 3 to 15 KeV by electro static field.

The EBCCD 96 uses a photocathode 102 installed in a vacuum tube 100 to convert an optical image of the object 84 into electrons. A detector 98 then receives the electrons from the photocathode 102 to form an electronic image of the object 84. The photons transmitted from the second set of fibers 88 are converted by the photocathode 102 of the EBCCD 100 into photoelectrons with a quantum efficiency of approximately 10%. Each photoelectron is accelerated to approximately 3–15 KeV to bombard the detector 98 through an electronic lens system (not shown). The bombardment results in thousands of secondary electrons being produced in the detector 98. This production of secondary electrons is localized in a very small area thus producing a high gain within the EBCCD 96. This gain allows the EBCCD 96 to detect a single photoelectron. The EBCCD 96, therefore, has an overall single photon efficiency about 10% or more and making the EBCCD 96 several orders of magnitude more sensitive than conventional CCD's.

Further, the EBCCD 96 maintains a clear image providing spatial resolution of about 20 μm at an exposure level of $10^{-4}$ lux. By achieving such high resolution at such a low light level, the fiber bundle 82 can be very small thus diminishing the intrusiveness of the endoscope 80.

Design of EBCCD with Electro-static Focusing

Figure 8:
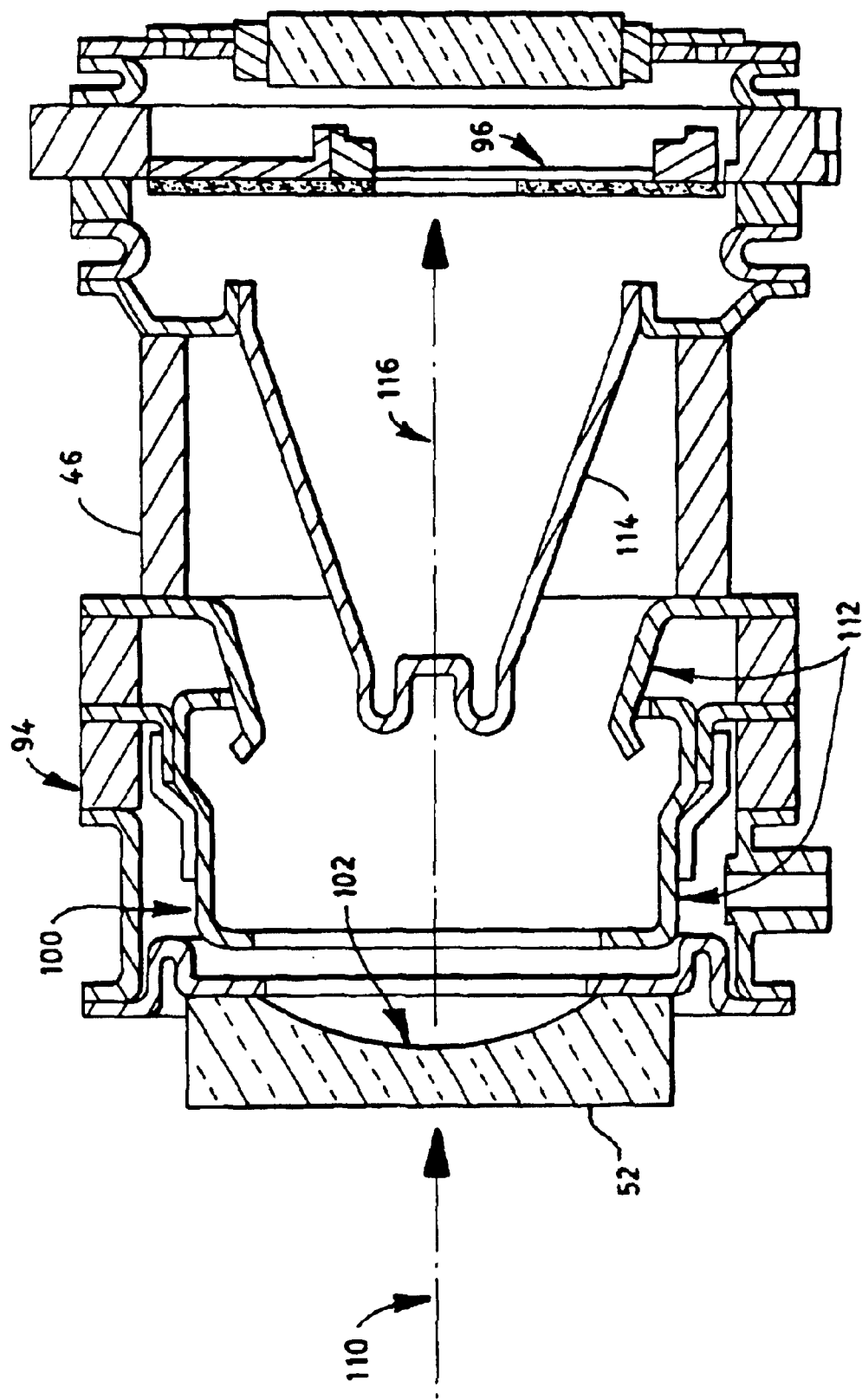
FIG. 8 shows a schematic diagram of a camera used in the endoscopic system of FIG. 7.

Referring now to FIG. 8, a preferred embodiment of the camera 94 is shown. The camera 94 is shown with radiation 110 entering the radiation converter 40. As previously described, the radiation converter 40 comprises a scintillator 40 which converts the radiation 110 into visible light. The visible light is then transmitted through the fiber optic plate 52 into the light-tight housing 46.

Coated on an interior surface of the fiber optic plate 52 is photocathode 102 which converts the visible light to electrons 116. The electrons 116 are then accelerated by an electric field generated by electrodes 112 and anode 114. The accelerated electrons 1 6 then impinge upon the EBCCD 96 creating secondary electrons thus amplifying the image conveyed by the radiation 110. The EBCCD 96 is a megapixel EBCCD 96 with a gain of approximately G=4000 at a tube voltage of 15 keV. The EBCCD 96 has a spatial resolution of approximately 20 $\mu$m at an exposure level of $10^{-4}$ lux. Further, the EBCCD 96 has a comparatively better amplitude spectrum, due to lower gain fluctuation and lifetime of more than 2000 hours at illumination of $10^{-2}$ lux while maintaining a stable gain over the lifetime of the camera 94.

The electrodes 112 are also used to create an electric field to dynamically select demagnification of the detector so as to govern an area of an object to be imaged. In the preferred embodiment, the demagnification can be up to 5. Thus, by adjusting the electric field, demagnification of the detector is achieved that allow a 1×1 cm$^2$ detector to image a 5×5 cm$^2$ object.

The EBCCD 96 of the preferred embodiment has 1024× 1024 pixels with pixel size 13.1×13.1 $\mu$m$^2$ and a sensitive area of 13.4×13.4 mm$^2$, having a demagnification of 5. The EBCCD 96 is manufactured in three phase, i.e., having three electrodes per pixel. Three levels of polysilicon gate technology using two-levels of gate dielectric (SiO$_2$+Si$_2$N$_4$) layer are also used. The EBCCD 96 has an n-type buried-channel structure and the p-silicon has a resistivity of approximately 4–20 $\Omega$/cm.

The imaging part of the detector 98 consists of an active area divided into two 512 row×1024 column regions which can be shifted up and down independently towards to appropriate output registers. Independent control over the parallel clocking of each of these two areas is provided such that the charge in different areas can be shifted in opposite directions. The output amplifiers are buried-channel MOS-FETs connected to floating diffusion nodes where the signal charge is offloaded.

The EBCCD 96 incorporates Multi-Pinned Phase (MPP) technology to significantly reduce the dark current. The EBCCD 96 is chemically etched in an isotropic silicon etching solution in a rotating disc system in order to make detection efficiency uniform over the entire detector. Preferably, hydrodynamical rotation is used to obtain thinned EBCCD substrates with thicknesses to 8 $\mu$m and nonuniformity less than 10% over the full image area.

To obtain a high gain and to reduce recombination, a stable electric field not less than 5 kV/cm is created near the back-side surface of the thinned detector 98.

After the thinning procedure, a shallow p+ layer is formed by ion implantation using an annealing technique and surface chemical treatment. Low temperature annealing is used in the preferred method due to its capability to create good image uniformity and low dark current.

A stable "dead layer" having a depth of less than 1000 Å is then created by properly choosing an ion implantation dose and energy which operate with the high values of the internal electric field from p+–p high-low junctions and with the low efficient surface recombination rate of the p+–surface.

The combination of all these technologies result in a stable and uniform detector for electrons above a few KeV's.

After these procedures the detector 98 is mounted into a metal-ceramic housing (not shown) and electrical connections are formed.

The vacuum tube 100 is then mounted around the metal housing. The vacuum tube 100 has a magnification selectably changeable from 0.62 to 1.3. A multialkali photocathode 102 with diameter of approximately 40 mm is deposited on the input fiber optic window which is the terminus of the second set of fibers 88. Preferably, the average quantum efficiency of the photocathode 102 is 10% at 500 mm or better. In the preferred embodiment, The maximum voltage on the photocathode 102 is 20 kV.

The EBCCD 96 is installed with the use of a vacuum flange by laser welding. The vacuum tube 100 is then annealed at temperature less than 320 ° C. Afterwards the photocathode 102 is made on the fiber optic plate 52.

Transmission Endoscopy

Figure 9:
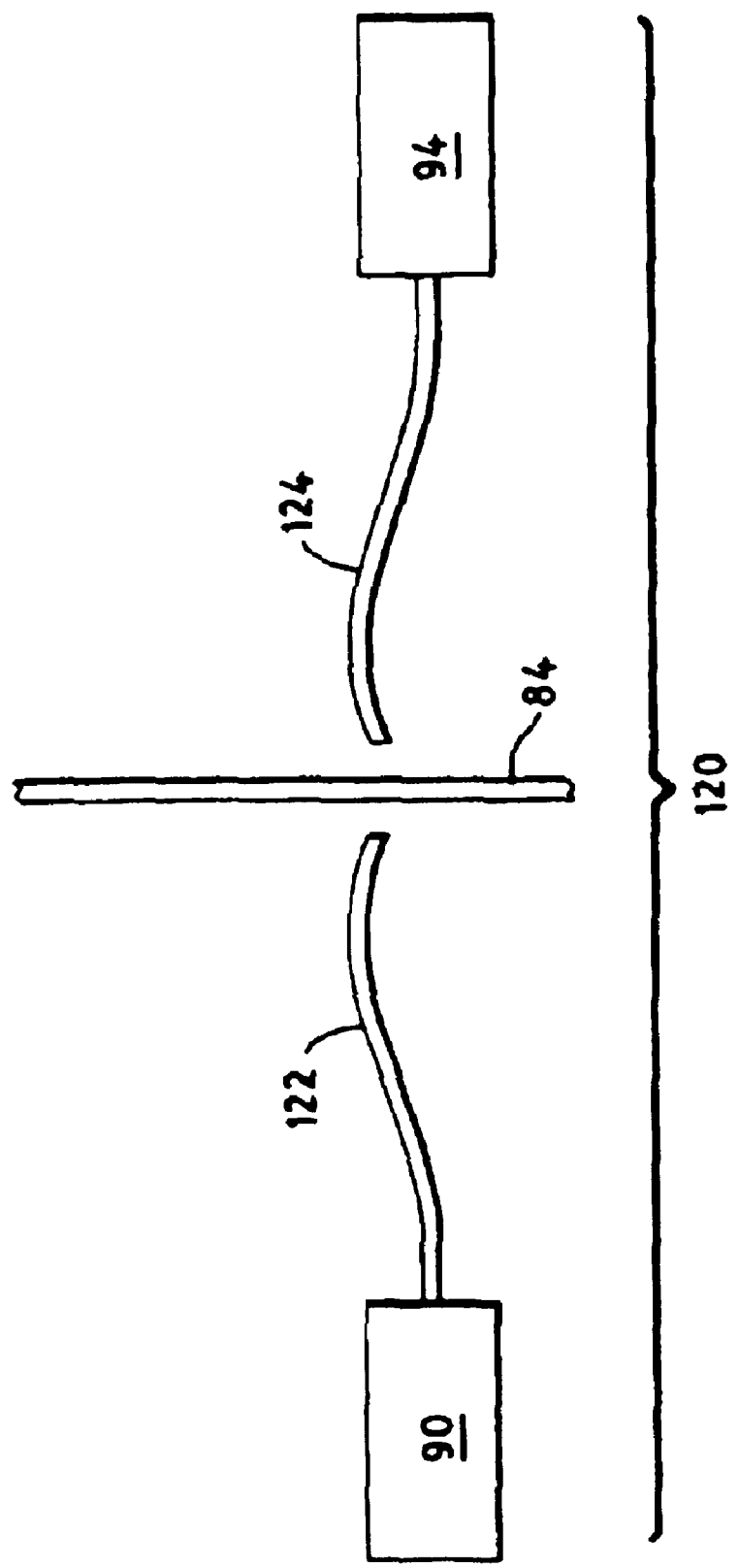
FIG. 9 shows a block diagram of a transmission endoscope utilizing the camera of FIG. 8.

Another application of the invention is for use as a transmission endoscope 120 as shown in FIG. 9. Since an EBCCD is extremely sensitive to light, a light source 90 can be placed one a first side of an object 84 and the camera 94 on a second side of the object 84 opposed to the first side. The light from the light source 90 can directly illuminate the object 84 or can be transmitted to the object 84 by transmission fibers 122, depending upon where the object 84 is located. Light passing through the object 84 is gathered by the receiving fibers 124 and transmitted to the camera 94. As previously described, the image is then displayed or recorded.

Correcting Motion

In the aforementioned medical systems, object motion is corrected by imaging at rates of speed greater than the rate of object motion. Further, color imaging is generally not used and, therefore, the need to register individual pixels is not of consequence. However in other applications of the invention such as low-light photography, fast-moving objects and color registration of a moving object becomes a significant problem.

To accomplish color registration of a moving object thereby removing any blur instilled by the motion, the invention uses either three photo-detector to receive the pictures of each color component at the same time or one photo-detector with several rotating color filters to receive the information of the color components in several subsequent time frames. The latter method is commonly known in the art as time-delay integration. The time frames are separated by a time interval of approximately 0.01 second between consecutive frames. The problem can be expressed algebraically as follows. Let $R_{ph}$ $G_{ph}$ $B_{ph}$ be the average number of photons per pixel passing through the red, green, and blue filter per pixel respectively. The average number of photo-electrons for each of the red, green and blue components is:

$$N_R = R_{ph} * QE(\lambda) * t, \quad N_G = G_{ph} * QE(\lambda) * t, \quad N_B = B_{ph} * QE(\lambda) * t,$$

where $QE(\lambda)$ is the quantum efficiency of photo-sensor, and t is the color filter transmission. The number of photo-electrons in different pixels fluctuates independently according to the Poisson statistics. Noise due to detector and electronics is added in each pixel with its fluctuation assumed to be a Gaussian.

If, however, the object is moving too fast relative to the exposure time of the camera, then the standard deviation of the fluctuation increase dramatically resulting in a blurred image.

Three Photo-Sensors

In the case of using three photosensors, all three color components, red, green and blue, are available at the same time. A single beam of image-bearing light enters a camera and is split by dichroic mirrors to transmit color components of the light toward individual photosensors. The image capture time is primarily dependent upon capture time of the photosensors.

One Photo-Sensor with Four Rotating Color Filters

When very limited amount light is available and/or when only one photo-sensor is available, due to the compactness of night cameras for example, time-delay integration is a preferred method of taking color images. In this case, the main task of the image reconstruction is to combine images captured at different moments in time and with different color filters into a single correctly colored image. This is known in the art as color registration. To accomplish this, it is necessary to compensate the motion of the object between image captures to reduce the smearing of the images due to the motion during a finite, approximately 10 msec, exposure time, and to suppress the Poisson fluctuations of the photon numbers.

The procedure of reconstruction is preferably also resistant to bad conditions, when some of the images are captured with insufficient light or other obstacles intercede, such as a bird flies into the view for example. Under such circumstances, the colors are slightly distorted, but the outlines of the details are still correctly reproduced. The motion of a slow-moving object is compensated by scaling, interpolating and aligning the corresponding pixels of the four different pictures.

For a brightness of color i of an image at a certain point in an object is $b_i$ prior to influence by the color filters, the average number of photo-electrons at the corresponding pixel after the color filters is $$A_j = \sum_i t_{ji} \cdot QE_i \cdot b_i \cdot T \cdot S,$$

where S is the area of the pixel and T is the exposition time. In matrix form, $A_j = C \times B$, where $Cji = t_{ji} * QE_i$ are attenuation coefficients, and $B_i = b_i * T * S$ are the number of incoming photons. In the preferred embodiment, the color wheel has two clear filters, or no filter, in two separate filter positions. Images captured through these filters are referred to as W images. The two other filter positions are red, R. and green, G, filters. Blue is determined by subtracting the R and G images from a W image.

Two identical W images may be added together with $A_0$ becoming the total number of photoelectrons in two shots and with the coefficients $C_{i0}$ doubled. Then matrix C become 3×3 and, thus, the numbers of incoming photons are calculated by means of its inverse $C^i$ as $B = C^{i*}A$. Replacing the unknown averages $A_j$ by the numbers $a_j$ of actually produced and registered photo electrons, we obtain for the estimate $$B = C^{-1}*a.$$

Since numbers have the Poisson distribution with the dispersions $A_j$, the estimate B has the correct mean value and the dispersion $$D(B_i) = \sum_j (C^i)_{ij}^2 \cdot A_j.$$

The lowest image on all figures is the result of color smoothing. The color smoothing is a complicated task since simple color averaging over a number of nearby pixels would smear the borderlines of regions of different colors and intensities and seriously degrade the resolution of the image, which is not acceptable. Before any averaging, statistical tests are made to check, whether, within the statistical errors, the colors of neighboring pixels differ significantly or not. After a number of repeated averaging, the true borderlines survive, while inside each region the color becomes smoothly changing or uniform.

When an object is moving very quickly though, the blurring of the image can be too excessive to use the aforementioned brightness smoothing. One reason for this is that the borderlines may be indeterminable. If, for example, the object is a license plate of a car traveling at 36 km/hour of transversal speed in dimly light conditions. Assuming a size of one pixel in the camera, approximately 0.02 mm, corresponds to 1 mm in the license plate and the exposure time of the camera is 0.01 seconds. The motion of the car produces a smearing of about 100 pixels in every one of the pictures taken.

Compensation of the shift of the image of the moving object is performed in two steps. First, the amplitudes of several of the lowest Fourier harmonics of the two W images are calculated. From these amplitudes, a coordinate transformation mapping one of the W images into the other is performed. The corresponding transformations for R and G images can be computed by interpolation. However, after these transformations, most of the pixels of one image will lie somewhere between the pixels of the other image. The second step must then establish the pixel-to-pixel correspondence.

The second step is performed by computing interpolated pixel values before or after the previously described brightness smoothing over the original images. The blurring of the images caused by the motion of the object during the exposition time must first be suppressed though. If the fluctuations were absent, the blurring could be eliminated with arbitrary accuracy by means of a commonly used corresponding inverse integral transformation. However, this integral transformation increases fluctuations. Thus, when the blurring is partly suppressed, the resolution improves; and when the blurring is suppressed too much, the fluctuations increase and the resolution becomes worse.

The choice of the optimal degree of blur suppression and of the actual transformation function must comply with statistical criteria and may be different in differently illuminated parts of the image. Averaging removes some blur, but does so incompletely. The usual inverse integral transformation, disregarding the statistical fluctuations of the image, gives rather poor images, over-shadowed by heavy random background.

The blur removal method of the invention based on statistical methods makes better use of the information contained in the blurred image and gives much clearer pictures.

Figure 10A:
FIGS. 10A and 10B show images before and after, respectively, image correction as per the invention.
Figure 10B:
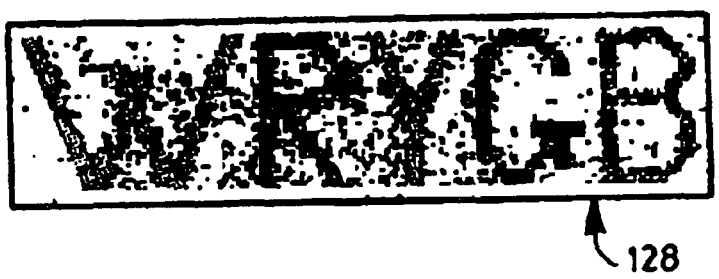

The typical result of blur removal by this method is illustrated by FIGS. 10A and 10B. As shown in FIG. 10A, original image 12B is overexposed (about 200 photo-electrons/pixel/color) and blurred over 100 pixel (Gaussian width) so R=20 photo-electrons/pixel/color. This blurring over 100 pixels is inside each of the W. R, G images. No letters except the left most "W" is remotely recognizable.

As shown in FIG. 10B post-blur removal image 128 has more fluctuations than the original image 126, containing some random background, but is well-readable. A similar blur removal effect is achieved for underexposure.

The image reconstruction method includes the analysis of the images to find the optimal parameters of motion compensation, of blur removal, and of color smoothing.

The method of blur removal is based upon the maximum likelihood method and fully exploits a priori non-negativeness of the light intensities. The solution of corresponding equations is done by fast recursive procedures starting from edges of the original image 126. For each pixel in a frame, two statistical estimates are obtained and balanced. The white frame having better statistical accuracy than the color frames is used as a mask for the red and green frames when the post-blur removal image 128 is reconstructed.

The method achieves a resolution of 40 to 60 line pairs at 15% MTF and a gain of approximately 5000, and thus a signal-to-noise ratio of 2 at $4 \times 10^{-5}$ lux, by integrating images over time, i.e. after matching regions with similar shape, color and intensity within certain well defined boundaries in pictures taken at adjacent time.

To reconstruct a colored image such as the original image 126, at least three colors are needed: red, green and blue (R,G,B, respectively), for example.

Light reflected from the original image 126 passes through three filters corresponding to the three colors. The average number of photons that pass through the red, green, blue filter per pixel is then $R_{ph}$, $G_{ph}$, $B_{ph}$, respectively. The average number of electron-hole pairs for red, green and blue components will be equal:

$$N_R = R_{ph} * QE(\lambda) * T,\ N_G = G_{ph} * QE(\lambda) * T,\ N_B = B_{ph} * QE(\lambda) * T,$$

where $QE(\lambda)$ is quantum efficiency of photosensor, T is color filter transmission. Monte-Carlo simulations have been performed for each component of light, i.e., RGB. The number of electron-hole pairs (e-h) in the detector fluctuates according to the Poisson statistics, in different pixels e-h pairs fluctuates independently.

Four filters were chosen: W, R, G and W. Two W filters allow to reconstruct a moving object more efficiently. The W filters are clear, or white.

The reconstruction of colored image takes into consideration the transparency of the color filters and the different sensitivity of a detector to red, green and blue (R,G,B, respectively) colors. Let index i=0,1,2 correspond to RGB colors, j=0,1,2,3 to 4 consecutively captured images, $t_{ij}$ be the transparency of the filters to photons of color i at shot j, and $q_i$ be the quantum efficiencies of EBCCD to RGB photons. Also, assume that the motion of the object is known. That is, using standard edge detection or other object location techniques, the correspondence of a pixel in one image to a pixel in a subsequent image has been displaced by a known amount.

If the brightness of color i of an optically generated image of the object prior to the color filters is $b_i$, the average number of photo-electrons at the corresponding pixel after the color filters is $$A_j = \Sigma t_{ij} * q_i * b_i * T * S,$$

where S is the area of the pixel and T is the exposition time. In matrix form A=C×B, where $C_{ji} = t_{ij} * q_i$ are attenuation coefficients, and $B_i = b_i * T * S$ are the numbers of incoming photons. Two identical W shots may be simply added together with $A_0$ becoming the total number of e in two shots and with the coefficients $C_{i0}$ doubled). Then matrix C becomes 3×3, and the numbers of incoming photons are calculated by means of its inverse $C^{-1}$ as $B = C^{-1} \times A$.

Replacing the unknown averages $A_j$ by the numbers $a_j$ of actually produced and registered electrons, we obtain for B the estimate $$B = C^{-1} \times a$$

Since numbers $a_j$ have the Poisson distribution with the dispersions $A_j$, the estimate B has the correct mean value and the dispersion.

$$D(B_j) = \Sigma (C^{-1})_{ij}^2 * A_j.$$

A test of color reconstruction used an EBCCD having a uniform QE $q_i = q$ (EBCCD has q about 0.1), and a transparency of R,G filters set to ½ resulting in matrix C/q and its inverse as

|       | R   | G   | B |   | | W | R  | G  |   |
|-------|-----|-----|---|---|---|---|----|----|---|
| c/q = | 1   | 1   | 1 | W | q × C-1 = | 0 | 2  | 0  | R |
|       | 0.5 | 0   | 0 | R |   | 0 | 0  | 2  | G |
|       | 0   | 0.5 | 0 | G |   | 1 | -2 | -2 | B |

The letters WRYGB in FIGS. 10A and 10B had colors (1,1,1), (1,0,0), (1,1,0), (0,1,0), (0,0,1) corresponding to white, red, yellow, green and blue, respectively, and their horizontal and vertical lines were 5 pixels wide. Each pixel of letter W got an average 3 photo-electrons at W shot, and ½ of an electron at R and G shots. The images were taken at approximately $0.5 \times 10^{-4}$ lux.

The compensation of the shift of the image of the moving object can be done in two stages. First, the amplitudes of several of the lowest Fourier harmonics of two W shots are calculated. From these amplitudes, the coordinate transformation mapping one shot into another, can be found and the corresponding trasformations for R and G shots can be computed by interpolation. However, after these transformations, most of the pixels of one shot will lie somewhere between the pixels of the other shot. The second stage should establish the pixel-to-pixel correspondence by computing interpolated pixel values before or after the brightness smoothing over the original shots.

The quality of the unsmeared image depends mostly on the ratio R=exposition/smearing and, to some extent, on the total width of the image and on the color of the background. The black background contributes less fluctuations into the smeared image and is the best for the unsmearing. If the smearing is measured in pixel widths and object is similar to that shown in the example, the ratio R>30 e/pix/col/pixels allows the complete unsmearing up to 1 pixel. For smaller R, the complete unsmearing is either not reasonable, or (for R<3 e/pix/col/pixel) totally fails due to strong fluctuations, but partial unsmearing to several pixel widths is still possible and may be very useful.

Partial unsmearing may be done by combination of the local averaging of the smeared image over a number of adjacent pixels and the unsmearing. Averaging reduces fluctuations and makes them statistically strongly correlated, what makes unsmearing possible, but blurs somewhat the unsmeared image, so it looks not fully unsmeared. The usual inverse integral transformation, disregarding the statistical fluctuations of the image, gives rather poor images covered by heavy random background. A novel unsmearing procedure based on statistical methods makes better use of the information contained in the smeared image and gives more clear pictures. The original image is overexposed (about 2000 e/pix/col) and smeared over 100 pixel widths so R=20 e/pix/col/pixel. No letters except the left most portion W can be guessed. The unsmeared image is more fluctuating than the original image and contains some random background, but is well readable.

Conclusion

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An imaging system, which defines an optical path therein, for capturing an image from the image-bearing radiation, the imaging system comprising a solid radiation bearing detector disposed in the optical path, comprising a very thin, about 50 to 100 micro-meter thick, and very heavy scintillator with a density greater than 6, which efficiently converts the image-bearing radiation into a visible light spectrum with a high spatial accuracy;
   a photocathode, disposed within the camera housing along the optical path to convert the converted radiation into a stream of electrons representative of the image-bearing radiation;
   an image amplifier disposed in the stream of electrons such that image amplifier electrostatically accelerates the stream of electrons, and an amplified detector disposed after the image amplifier and, upon input of the stream of electrons, being adapted to generate secondary electrons to further amplify the image represented thereby such that the amplified detector then converts secondary electrons into an electronic signal representative of the image.

2. A radiation imaging system, comprising a radiation source that projects radiation towards an object, thereby creating image-bearing radiation from the object towards the imaging system, and
   an imaging system, which according to claim 1, has a solid radiation bearing detector, comprising a very thin, about 50 to 100 micro-meter thick, and very heavy scintillator with a density greater than 6, which efficiently converts the image-bearing radiation into a visible light spectrum with a high spatial accuracy.

3. The imaging system according to claim 2, wherein the image amplifier is adapted to selectively electronically de-magnify the image-bearing radiation and thus adjust a resolution of the image.

4. The imaging system according claim 3, wherein the image amplifier is dynamically selectable to adjust de-magnification so as to govern an area of an object to be imaged.

5. The radiation imaging system according to claim 2, wherein the radiation source is adapted to electronically shift between a plurality of dynamically selectable positions such that the image transmitted by the image-bearing radiation changes for each of the plurality of positions.

6. The radiation imaging system according to claim 5, wherein the radiation source electronically shifts between two dynamically selectable positions to generate stereo pairs of three-dimensional images and to select the line-of-view of an object of interest to bypass other shadowing objects.

7. The radiation imaging system according to claim 5, wherein the radiation source is continuously deflected producing a plurality of radiation shadows that can be interactively "focussed" to various levels within the object.

8. The radiation imaging system according to claim 5, wherein the radiation source projects divergent rays of the radiation and has a spot size smaller than a resolution of the radiation imaging system.

9. The radiation imaging system according to claim 2, wherein the imaging system corrects for motion in a color image generated by capturing two or more consecutive sub-images, the imaging system further comprising,
   calculation means for calculating the shift vector between the two or more consecutive sub-images, using lists of characteristic quantities computed from the images;
   mapping means for mapping a coordinate transformation of a first image into a second image of the two or more consecutive sub-images;
   computing means for computing corresponding transformations of the two or more consecutive sub-images by interpolation; and
   reconstruction means for reconstructing the image from the two or more consecutive sub-images.

10. The radiation imaging system according to claim 9, further comprising processing means for differentiating between foreground and non-uniform background in the plurality of radiation shadows such that the non-uniform background can be subtracted from the image.

11. The radiation imaging system according to claim 10, wherein the processing means is adapted to replace one background with a second background.

12. The imaging system according to claim 2, further comprising optic means disposed within the camera housing for collecting the image-bearing radiation and defining the optical path, where the optic means is integral with the scintillator.

13. The radiation imaging system according to claim 2, wherein the scintillator has a density of at least 7.5 grams per cubic centimeter.

14. The imaging system according to claim 1, further comprising:
    filtering means for filtering the image-bearing radiation consecutively through a plurality of filters thus creating a plurality of sub-images;
    analysis means to distinguish between the changes of sub-images due to the filtering of the radiation and due to the object motion during and between the exposures; and
    correcting means for correcting the changes of the plurality of sub-images due to the object motion and correlating the plurality of sub-images into a color image.

15. The imaging system according to claim 1, wherein the amplified detector has a radiation-stable "dead layer" created by ion implantation.

16. The imaging system according to claim 1, comprising
    a solid radiation bearing detector which is a flexible optic light guide system made of many tiny about 5 micrometer diameter fibers, and a light source thereby creating image bearing radiation from the reflected light from the object;
    a photocathode which converts the radiation bearing light, reflected from object and transmitted through the fibre optic light guide system into streams of electrons, which can be gated according to their arrival time at the high voltage electrodes;
    an image amplifier disposed in the stream of electrons such that the image amplifier electrostatically accelerates or decelerates the stream of electrons according to their arrival time; and
    an amplified detector disposed after the image amplifier and, upon input of the stream of electrons, being adapted to generate secondary electrons to further amplify the image represented thereby such that the amplified detector then converts secondary electrons into an electronic signal representative of the image.

17. The imaging system according to claim 16, wherein the photocathode is fabricated of gallium-arsenide, which, with the scintillator removed, converts the infrared radiation bearing light, reflected from the object and transmitted through the fibre optic fight guide system, into streams of electrons, which are gated according to their arrival time at the high voltage electrodes, to analyze the time dependent images at the detector, after an initial flash from the light source has been emitted and reflected.

18. The imaging system according to claim 16, wherein the image amplifier is adapted to selectively electronically magnify the image-bearing radiation as measured at the detector and thus adjust a resolution of the image.

19. The imaging system according to claim 18, wherein the image amplifier is dynamically selectable to adjust magnification so as to govern an area of an object to be imaged.

20. The imaging system according to claim 1, with the scintillator removed, further comprising:

filtering means for filtering the image-bearing radiation consecutively through a plurality of wavelength filters which allows only light within preselected ranges of wavelengths to pass, so that a "colored" image can be formed using these sub-images of different wavelengths; analysis means to distinguish between the changes of sub-images due to the filtering of the fight of different wavelengths and due to the object motion during and between the exposures; and correcting means for correcting the changes of the plurality of sub-images due to the object motion and correlating the plurality of sub-images into a color image.

* * * * *